United States Patent
Lee et al.

(10) Patent No.: US 7,260,565 B2
(45) Date of Patent: Aug. 21, 2007

(54) METHOD AND APPARATUS FOR HIGH SPEED TABLE SEARCH

(75) Inventors: Dennis Sungik Lee, Saratoga, CA (US); Michael Veng-Chong Lau, San Jose, CA (US); Pei-Feng Adrian Wang, San Jose, CA (US); Chuen-Shen Bernard Shung, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 776 days.

(21) Appl. No.: 10/750,960

(22) Filed: Jan. 5, 2004

(65) Prior Publication Data

US 2004/0139071 A1 Jul. 15, 2004

Related U.S. Application Data

(63) Continuation of application No. 09/800,784, filed on Mar. 8, 2001, now Pat. No. 6,678,678.

(60) Provisional application No. 60/188,335, filed on Mar. 9, 2000.

(51) Int. Cl.
  *G06F 15/16* (2006.01)
  *G06F 17/00* (2006.01)
(52) U.S. Cl. .......................... 707/3; 709/217; 709/218
(58) Field of Classification Search .................... 707/3; 709/217, 218
See application file for complete search history.

(56) References Cited

U.S. PATENT DOCUMENTS 5,278,789 A  1/1994  Inoue et al.

(Continued)

FOREIGN PATENT DOCUMENTS

| EP | 0312917 A2 | 4/1989 |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |

(Continued)

OTHER PUBLICATIONS

Implementation of PSIP generating system for data broadcasting based on PMCP Young Kyung Park; Jeong-Dong Kim; Yong Ho Kim; Joong Kyu Kim; Jin Soo Choi; Jin Woo Hong; Advanced Communication Technology, 2005, ICACT 2005. The 7th International Conference on vol. 2, Feb. 21-23, 2005 pp. 1175-1179 vol. 2.*

(Continued)

*Primary Examiner*—David Jung
(74) *Attorney, Agent, or Firm*—Squire, Sanders & Dempsey L.L.P.

(57) ABSTRACT

A table searching system for facilitating high speed linear searching of a table of information by a plurality of searching agents is provided. The system includes: a memory unit for storing a table of information including a plurality of data entries each having data contents; a plurality of searching agents each being communicatively coupled with the memory unit, and having a port for receiving an associated search key value; and a memory controller unit providing a centralized interface between the memory unit and each of the agents, the controller unit being operative to control the memory unit to provide the contents of a current one of the table entries to each of the agents during each of a plurality of cycles of operation. Each of the searching agents is operative to determine an associated best matching one of the data entries based on comparisons between the associated key value and the contents of the data entries provided by the memory unit.

26 Claims, 7 Drawing Sheets

U.S. PATENT DOCUMENTS

| | | | |
|---|---|---|---|
| 5,390,173 A | 2/1995 | Spinney et al. | |
| 5,414,704 A | 5/1995 | Spinney | |
| 5,423,015 A | 6/1995 | Chung | |
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,555,398 A | 9/1996 | Raman | |
| 5,568,477 A | 10/1996 | Galand et al. | |
| 5,579,301 A | 11/1996 | Ganson et al. | |
| 5,644,784 A | 7/1997 | Peek | |
| 5,652,579 A | 7/1997 | Yamada et al. | |
| 5,696,899 A | 12/1997 | Kalwitz | |
| 5,742,613 A | 4/1998 | MacDonald | |
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,940,596 A | 8/1999 | Rajan et al. | |
| 5,983,223 A | 11/1999 | Perlmann | |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,338,057 B1 | 1/2002 | Weeks | |
| 6,415,285 B1 | 7/2002 | Kitajima et al. | |
| 6,523,023 B1 | 2/2003 | Sonnenberg | |

FOREIGN PATENT DOCUMENTS

| | | |
|---|---|---|
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO98/09473 | 3/1998 |
| WO | WO99/00938 | 1/1999 |
| WO | WO99/00939 | 1/1999 |
| WO | WO99/00944 | 1/1999 |
| WO | WO99/00945 | 1/1999 |
| WO | WO99/00948 | 1/1999 |
| WO | WO99/00949 | 1/1999 |
| WO | WO99/00950 | 1/1999 |
| WO | WO9900936 A1 | 6/2001 |

OTHER PUBLICATIONS

Distributed algorithms for shortest-path, deadlock-free routing and broadcasting in arbitrarily faulty hypercubes Peercy, M.; Banerjee, P.; Fault-Tolerant Computing, 1990. FTCS-20. Digest of Papers., 20th International Symposium Jun. 26-28, 1990 pp. 218-225.*

A study on implementation of table generating system for data broadcasting based on ACAP [advanced common application platform]Yong Ho Kim; Young Kyung Park; Ji Hoon Choi; Joong Kyu Kim; Jin Soo Choi; Jin Woo Hong; Intelligent Signal Processing and Communication Systems, 2004. ISPACS 2004. Proceedings of 2004 International Symposium on Jun. 4, 2004.*

"A High-Speed CMOS Circuit for 1.2-Gb/s 16×16 ATM Switching," Alain Chemarin et al. 8107 IEEE Journal of Solid-State Circuits 27(Jul. 1992) No. 7, New York, US, pp. 1116-1120.

"Local Area Network Switch Frame Lookup Technique for Increased Speed and Flexibility," 700 IBM Technical Disclosure Bulletin 38(Jul. 1995) No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28(Jul. 1993) No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

Kenneth Schultz, et al., "Architectures for Large-Capacity CAMs," Integration, the VLSI Journal, North Holland Publishing Company, Amsterdam, The Netherlands, vol. 18, No. 2, Jun. 1, 1995.

Elm et al., "Functional Memory Array Testing Using Associative Search Algorithms," European Test Conference, 1993, Proceedings to ETC 93, Third, Apr. 19-22, 1993, pp. 139-148.

Pao et al., "Efficient Hardware Architecture for Fast IP Address Lookup," INFOCOM 2002, Twenty-First Annual Joint Conference of the IEEE Computer and Communication Societies, Proceedings, IEEE vol. 2, Jun. 23-27, 2002, pp. 555-561, vol. 2.

Elm et al., "Fault Detection and Fault Localization Using IDDQ-Testing in Parallel Testable FAST-SRAMs," VLSI Test Symposium, 1994, Proceedings, 12th IEEE, Apr. 25-28, 1994, pp. 380-385.

* cited by examiner

METHOD AND APPARATUS FOR HIGH SPEED TABLE SEARCH

REFERENCE TO RELATED APPLICATIONS

This application claims priority from U.S. Provisional Patent Application Ser. No. 60/188,335, filed Mar. 9, 2000. The contents of this patent application are hereby incorporated by reference. This application is a continuation of U.S. Ser. No. 09/800,784, filed Mar. 8, 2001, issued as U.S. Pat. No. 6,678,678.

BACKGROUND OF THE INVENTION

1. Field of the Invention

The present invention relates generally to a method and apparatus for searching an electronically stored table of information including a plurality of table entries, and more specifically to a method and apparatus for facilitating high speed linear searching of a table by a plurality of agents that are each required to search many entries of the table using different search keys.

2. Description of the Related Art

In the fields of electronic data communications and data processing, electronically stored tables of information are used in vast variety of applications to provide a mapping between two or more information spaces. The tables of information, which include a plurality of entries, may be searched in accordance with many different methods.

Generally, a searching agent searches a table using a search key, and may read one or more tables entries to determine an exact match or a best match depending on the particular application requirements. It is a common design requirement that each of a plurality of searching agents having different search keys is required to search a single table of information. For applications in which it is generally not feasible to employ a multiplicity of memory devices storing the same table of information, an arbitration scheme is typically employed to resolve requests from each of the searching agents for access to the single table.

Many algorithms and devices have been developed to efficiently search tables of information. A basic brute force method is linear searching wherein a device searches a table linearly one entry at a time. Linear searching is the simplest search method, and it is ideal for searching small tables in applications having slow search requirements. However, linear searching becomes impractical as the table sizes increase because the maximum search time is proportional to the table size.

In order to shorten the table search time, binary searching methods may be used wherein all entries of the table are sorted in a particular order, and the search times are equal to $\log_2$ (table size). Binary searching methods are particularly desirable for searching large tables using software, but sorting the table entries in a particular order is not a simple task. Due to this high maintenance requirement, binary searching is often not feasible to implement in hardware.

One of the quickest methods of table searching uses content addressable memory (CAM) searching wherein all table entries are compared against a search key at the same time, and the search result is delivered to an output instantly. However, CAM searching provides high search performance at the expense of implementing greater logic using a greater amount of silicon real estate. Moreover, there is typically a limit to the size of comparison fields (i.e. data width) and the size of payload fields which may be used in CAM searching.

Some of the most common methods of table search employ hashing algorithms in which table entries are grouped into different buckets in accordance with the particular type of hashing algorithm (i.e. crc32). Searching systems employing hashing algorithms are capable of narrowing the searching area to a specific location (a bucket), and this limits the maximum searching time. The maximum table searching time is based on the size of the bucket, and the table search time remains constant as the number of buckets increases. As the number of the table entries increase, the possibility that two or more entries are hashed to a same bucket also increases. If the maximum table entry (the size of table) is considerably larger than the typical number of entries used at the same time and the hash algorithm spreads the entries evenly, there is a good chance that only one or two entries are in a bucket. In this case, the average search time will be rather short (one or two clock cycles per search). A good hash algorithm scatters table entries evenly over the search table, but there is a possibility that many table entries may hashed into the same bucket. Thus, using 100 percent of a table is not practical, and the size of the table often needs to be much larger than the typical number of table entries.

In the field of data communications, there are many applications wherein each of a plurality of searching agents is required to search a single table of information. In routing and switching devices, a table of information is often used to provide a mapping mechanism for forwarding data, typically in the form of a packet (e.g., an Ethernet Packet), from one location to another location.

As packets arrive at each of a plurality of associated ports of a switch or router device, a plurality of port searching agents, each associated with one of the ports, must search information stored in the table to determine an appropriate action. For example, if the table includes an entry providing a direction for the arrived packet, the device forwards the packet in the direction indicated. If the table does not include an entry providing a direction for the arrived packet, the device may handle the packet based on a default setting. Examples of default settings include sending the packet to all available ports (broadcasting), sending the packet to a central processing unit (CPU) for analysis in accordance with a predefined set of rules, or dropping the packet. For Ethernet routing applications, a table of information is typically organized based on particular fields (e.g., a medium access control (MAC) Address, an IP Address, a Virtual LAN ID, etc.) of a packet. When particular fields of the packet match particular fields of the table, the device utilizes the corresponding information in the table to forward the packet.

In conventional table searching systems wherein each of a plurality searching agents is required to search a single table of information, a "pull" searching method is typically employed wherein each of the searching agents is required to initiate table searching. An arbitration scheme is usually employed to resolve requests initiated by each of a plurality of searching agents for access to the single table.

Figure 1:
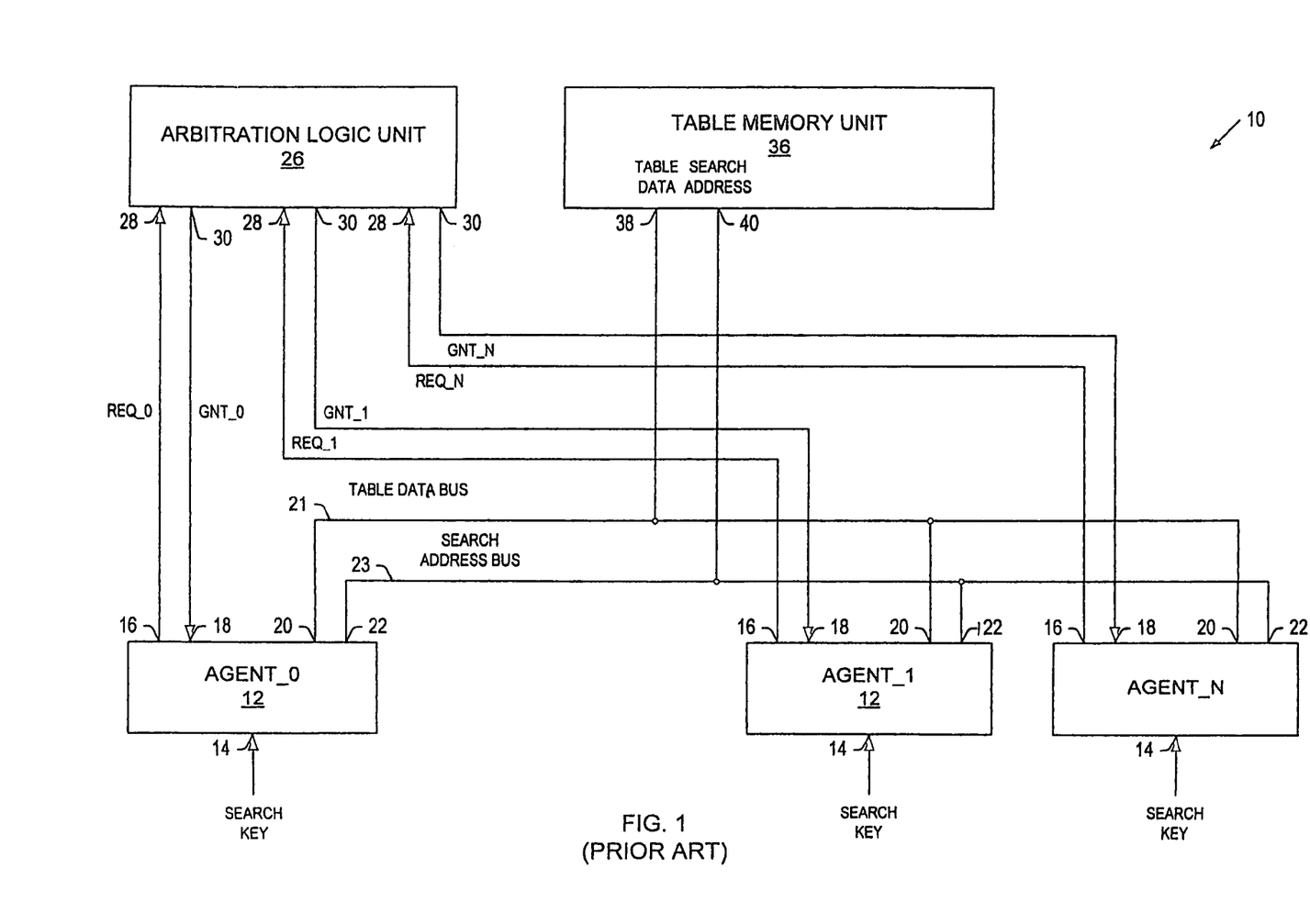
FIG. 1 is a generalized circuit block diagram illustrating a conventional table searching system having an arbitration unit for resolving requests from a plurality of searching agents for access to a table of information in accordance with a prior art pull type searching method.

FIG. 1 shows a generalized block diagram of a conventional table information searching system at 10, the system operating in accordance with conventional pull search techniques. The system 10 includes a plurality of N+1 searching agents 12 designated AGENT_0, AGENT_1, . . . AGENT_N. As an example, each of the searching agents 12 may be a port agent communicatively coupled with a receiving port of a switching device. Each of the searching agents 12 includes: a receiver port 14 for receiving a search key (e.g., a destination address of a data jacket); an arbitration request signal output port 16 for providing one of a plurality of N+1 request signals designated REQ_0, REQ_1, . . . REQ_N; an arbitration grant signal input port 18 for receiving an associated one of a plurality of N+1 grant signals designated GNT_0, GNT_1, . . . GNT_N; a table data input port 20 for receiving table information via a table data bus 21 as further explained below; and a memory address output port 22 for providing address values to a search address bus 23 as further explained below.

The system 10 further includes; an arbitration logic unit 26 having a plurality of request signal input ports 28 for receiving associated ones of the arbitration request signals, and a plurality of N+1 arbitration grant signal output ports 30 each providing an associated one of the arbitration grant signals to port 18 of an associated one of the agents 12; and a table information memory unit 36 for storing a table of information, and having a table data output port 38 for providing table data to the table data input port 20 of selected ones of the searching agents 12 via the bus 21, and a search address input port 40 for receiving the memory address values from the ports 22 of selected ones of the agents 12.

The table information memory unit 36 is typically implemented using static random access memory (SRAM) technology, and therefore only one of the entries of the table of information stored therein may be accessed at a time. Because of this fundamental feature of SRAM technology, only one of the agents 12 may access the table information unit 36 at a time. However, each of the agents 12 may have a different search key value for searching the table stored in the memory unit 36, and therefore there is a conflict.

Because only one of the table entries stored in the memory unit 36 may be accessed at a time, the arbitration logic unit 26 is needed to arbitrate among requests received from the searching agents 12 for access to the memory unit. The arbitration logic unit 26 receives and resolves the requests, and provides the grant to select corresponding ones of the searching agents 12. In response to the associated one of the grant signals being asserted, a selected searching agents 12 begins to provide one or more address values sequentially to port 40 of the memory unit 36 via the bus 23. In response to each of the address values, the memory unit provides the contents of a table entry stored at the specified address, to all the agents via the data bus, although only selected agents process the data from the memory. Each of the agents is operative to execute a searching process to determine a match between the search key value and one of the table entries. If the searching system needs to search every table entry to determine a best available match, instead of an exact match, the required search time becomes very lengthy.

A problem associated with the prior art table searching system 10 is that the system is not scalable to a large number of searching agents 12 because only one of the agents 12 may access the table information unit 36 at a given time, and so the total required search time for processing all the search key increases linearly as the number of searching agents increases because only one search key can be processed at a time in accordance with "pull" search techniques. Stated alternatively, the total number of cycles required for searching is proportional to the number of searching agents.

For example, in a switching device, as the number of port searching agents (each having a different destination address of an associated incoming packet) increases linearly, the required search time increases linearly because only one packet can be processed at a time in accordance with "pull" search techniques. This becomes a major performance bottleneck when the switching device requires the processing of a large number of packets simultaneously. For example, if the minimum packet forwarding time is 80 clock cycles and the maxim search time is eight clock cycles, the switching device can forward a maximum of ten packets at the same time. If the switching device needs to forward more than ten packets at the same time, then search table using a "pull" search technique becomes a performance bottleneck. This is especially crucial if the maximum search time is very large. If the searching system needs to search every table entry to determine a best available match, instead of an exact match, the search time for processing multiple packets is quite lengthy.

SUMMARY OF THE INVENTION

It is an object of the present invention to provide a method and apparatus for facilitating high speed linear searching of a table of information by a plurality of searching agents that are each required to search the contents of many entries of the table using different search keys.

It is also an object of the present invention to provide a high performance and cost effective method and apparatus for facilitating high speed linear searching of a table by a plurality of searching agents.

It is a further object of the present invention to provide a method and apparatus for facilitating high speed linear searching of a table of information by a plurality of agents wherein the number of searching agents is easily scalable without sacrificing searching performance.

In one embodiment, the present invention is directed to a table searching method. In the method, at least one memory unit is provided having a table of information including a plurality of data entries and a plurality of searching agents are provide with each agent being communicatively coupled with the memory unit. Each of the searching agents receives an associated search value and also receives a table entry from the plurality of data entries. The agents process the table entry to determine if a match occurs between the associated search value and the table entry.

In addition, the table searching method is applicable when the memory unit has a plurality of tables and the agents receive both the table entry and a table address associated a selected table of the plurality of tables. The match determination can be accomplished as an associated best matching of a plurality of table entries in accordance with a longest prefix match searching process or a policy match searching process.

The table searching method also provide a controller unit that controls the memory unit and provides a series of memory address values to the memory unit by the controller unit. In that case, the table entries received by each of the agents are based on the memory address values. In addition, each of the agents is communicatively coupled with the controller unit and each of the agents provides a search enable signal to the controller unit in response to receiving the associated search value. Thus, the controller unit does not provide the series of memory address values until a search enable signal is received from at least one of the agents.

In one embodiment, the present invention is directed to a table searching method In the method, at least one memory unit is provided having a table of information including a plurality of data entries and a plurality of searching agents are provide with each agent being communicatively coupled with the memory unit. A table entry from the plurality of data entries is broadcast by the at least one memory unit to each of the agents wherein each of the searching agents determines if a match occurs between the associated search value and the table entry.

The present invention is also directed to a table searching system including: a memory unit for storing a table of information including a plurality of data entries each having data contents; a plurality of searching agents each being communicatively coupled with the memory unit, and having a port for receiving an associated search key value; and a memory controller unit providing a surface interface between the memory unit and each of the agents. The controller unit is operative to control the memory unit to provide the contents of a current one of the table entries to each of the agents during each of a plurality of cycles of operation. Each of the searching agents is operative to determine an associated best matching one of the data entries based on comparisons between the associated key value and the contents of the data entries provided by the memory unit.

In one embodiment of the present invention, each of the searching agents is operative to determine the associated best matching one of the data entries in accordance with a longest prefix match searching process. In another embodiment of the present invention, each of the searching agents is operative to determine the associated best matching one of the data entries in accordance with a policy match searching process.

The controller unit controls the memory unit by providing a series of memory address values to the memory unit. The memory unit is responsive to the memory address values, and operative to provide the contents of one of the table entries to each of the agents during each of the cycles.

An important advantage of the broadcast linear search method and apparatus of the present invention is that it solves the performance bottleneck problem associated with table searching by using push searching techniques wherein multiple packets can be searched and forwarded at the same time. In accordance push searching techniques, as the number of searching agents increases, the total search time stays constant. This method is ideal when multiple agents must search a same field in a given period of time. For example, each agent must search each of the table entries to determine a best match when the priority of best match is not in order.

The above and other objects, features and advantages of the invention will become apparent from the following description of the preferred embodiment taken in conjunction with the accompanying drawings.

DESCRIPTION OF THE PREFERRED
EMBODIMENTS

Figure 2A:
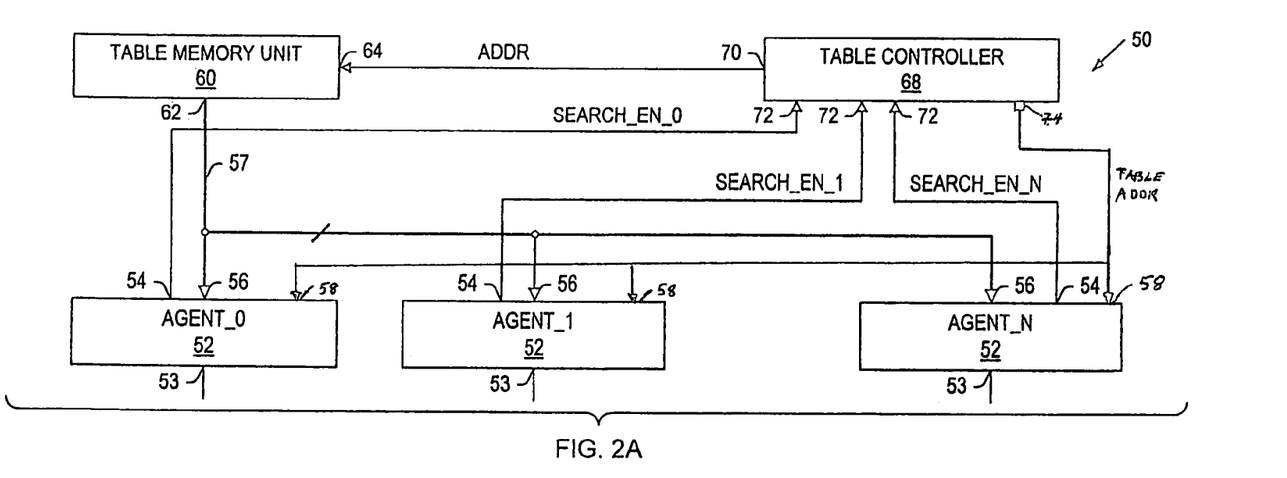
FIG. 2A is a generalized circuit block diagram illustrating a broadcast linear searching system in accordance with the present invention, the system having a controller unit providing a centralized interface between a table of information and a plurality of searching agents, the controlling unit being operative to push the contents of table entries to all of the agents simultaneously.

FIG. 2A shows a generalized circuit block diagram illustrating a broadcast linear searching system at 50 in accordance with the present invention. The system 50 includes: a plurality of N searching agents 52 designated AGENT_1, AGENT_2, . . . AGENT_N, each having a search key input port 53 for receiving search key values, a search enable output 54 for providing an associated one of a plurality of search enable signals designated SEARCH_EN_1, SEARCH_EN_2, . . . SEARCH_EN_N, and a data input port 56 communicatively coupled with a data bus 57, as further explained below. Each agent also has an input port 58 which receives the table address of the current data from the table memory unit. While only one table memory unit 60 is illustrated in FIG. 2A, in certain embodiments the system can have multiple table memory units or a table memory unit can have multiple tables and the table address is important in allowing the agents to distinguish between table memory units or tables.

The system also includes a table memory unit 60 for storing a table of information and having a data output port 62 for providing table information to port 56 of each of the searching agents 52 via the data bus 57, and an address control signal input port 64 for receiving an address control signal for instructing the table memory unit to access particular table entries at particular memory addresses, and to provide the data contents of the entries at its data output port 62. A table control unit 68 is also part of the system having an address control signal output port 70 for providing the address control signal to port 64 of the table memory unit, and also having a plurality of N search enable inputs 72 for receiving associated ones of the search enable signals from associated ones of the searching agents 52. The table control unit 68 also has a port 74 that provides the table address of the current data from the specific table from which the current data comes from. In one embodiment, the memory unit 60 is a static random access memory (SRAM) device, and each of a plurality of table entries is stored at an associated address of the SRAM device.

Figure 2B:
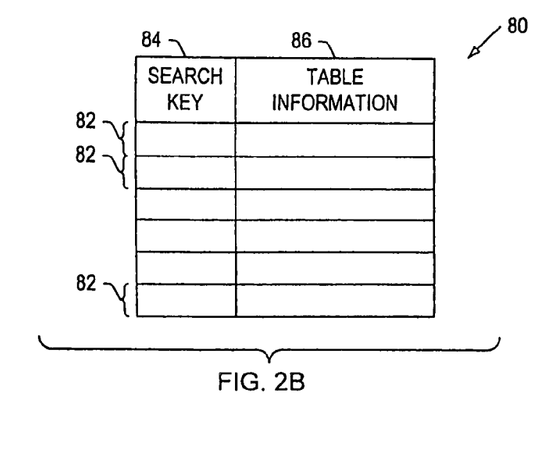
FIG. 2B is a table diagram generally illustrating an exemplary table of information which may be searched using the broadcast linear searching system of FIG. 2A.

FIG. 2B shows a table diagram generally illustrating an exemplary table of information at 80 which may be searched using the broadcast linear searching system 50 (FIG. 2A). The table 80 includes a plurality of table entries 82 each having an associated search key field 84, and at least one associated information field 86. The table 80 is stored in the table memory unit 60 (FIG. 2A). In the embodiment of the present invention wherein the table memory unit 60 (FIG. 2A) is SRAM device, only one table entries 82 may be accessed at the memory unit at a time.

Referring back to FIG. 2A, each of the searching agents 52, receiving associated search key values at its port 53, must perform linear searching through the contents of the tables entries 82 (FIG. 2B) in order to find table entries matching associated search key values in order to determine a match. As further explained below, each of the agents includes logic for comparing the contents of the tables entries 82 (FIG. 2B) to search key values. In accordance with linear searching, each of the agents must search at least a plurality of tables entries before determining a match. In one embodiment, each of the agents 52 must search all of the tables entries 82 (FIG. 2B), and determine a best match for each associated search key value by comparing the associated search key value to the contents of either or both of the contents of the search key field 84 (FIG. 2B), and the table information field(s) 86 (FIG. 2B). The priority of match can also be described by the address of the table and that can be used in making the match determination. Although the present invention is not limited to best match searching, a few examples of applications of the broadcast linear searching system 50 for best match linear searching application are described below.

In accordance with the present invention, the table controller unit 68 provides a centralized interface between the table memory unit 60 and each of the searching agents 52. The controller unit 68 is operative to push the contents of the tables entries 82 (FIG. 2B) one at a time to the data input port 56 of each of the searching agents simultaneously via the data bus 57. Unlike prior art table searching systems operating in accordance with pull-type searching methods, the agents 52 are not required to initiate access to a particular location of the table memory unit 60 one at a time, and therefore no arbitration logic is required to resolve requests from agents 52 for access to the memory unit. In the present invention, the contents of the table entries are "pushed" one at a time to each of the agents simultaneously as explained in detail below. Therefore, each of the agents 52 may simultaneously access the single table memory unit 60 in order to perform linear searching of the table, and overall searching performance is improved. Also, the cost of implementation is minimized because a different memory unit is not required for each agent.

When a valid search key values is received at port 53 of the one of the searching agents 52, the searching agent is operative to assert its associated search enable signal generated at its port 54. The table controller unit 68 is responsive to at least one of the N search enable signals being asserted, and is operative to begin sequentially accessing table entries 82 (FIG. 2B) of the table stored in the table memory unit 60 by sequentially transmitting memory address values to port 64 of the memory unit via the address control signal generated at port 70 of the controller. In response to the address control signal, the table memory unit pushes the sequence of the table entries 82 (FIG. 2B), including the contents of the table entries, to port 56 of each of the agents 52 via the data bus 57. In one embodiment of the present invention, the table memory unit 60, under control of the table control unit 68, pushes one of the table entries 82 (FIG. 2B) to each of the agents 52 upon each cycle of a clock (not shown). For applications in which each of the agents 52 is adapted to perform a best match type of searching algorithm, the actual contents of each of the table entries 82 (FIG. 2B) must be provided to each of the agents 52 because the matching priority of the entries must be determined by reading at least selected portions of the contents of the entries or the address of the entry in the memory. This is especially true for searching algorithms in which the table entries are not sorted in any particular order.

Note that when one of the agents 52 asserts its associated search enable signal, the table controller 68 may already be in progress of sequentially broadcasting the table entries. Therefore, a port agent may initially receive the contents of an entry other than the entry at the top of the list, that is an entry other than the entry stored at the first memory address sequentially accessed by the controller 68. Therefore, if each of the agents is adapted to perform a best match type of searching algorithm wherein the contents of each of a predetermined number of table entries 82 (FIG. 2B) must be processed by each of the agents before arriving at a best match, then each of the agents must include means for counting the number of table entries processed by the agent because the table controller 68 will continue broadcasting entries until none of the search enable signals received at its ports 72 is asserted.

Although FIG. 2A illustrates a single table memory unit 60, the invention is also applicable when multiple table memory units are employed. In order to increase the number of entries for some applications, multiple tables can broadcast the content at the same time. Thus, each additional table memory unit would also have connections to the agents, as shown in FIG. 2A for the table memory unit 60 and the agents 52. For example, in order to search 128 rules in 64 clock cycles, each agent needs receive the table entries from two tables at the same time, and the total number of rules is linearly proportional to the number of 64 entry tables.

Figure 2C:
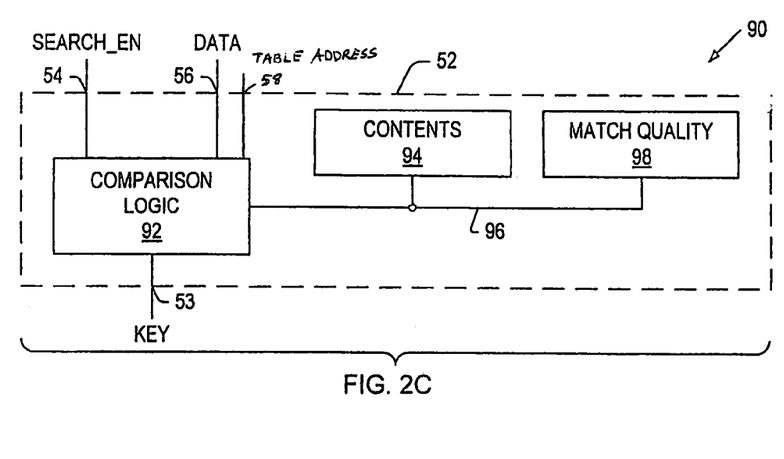
FIG. 2C is a generalized circuit block diagram illustrating components of one of the searching agents of FIG. 2A, the agent being operative to determine a best match.

FIG. 2C shows a schematic circuit block diagram illustrating components at 90 of one of the searching agents 52 (FIG. 2A) adapted for a best match type of linear searching algorithm. Each of the searching agents 52 includes: a comparison logic unit 92 having an input port connected to port 53 of the agent for receiving search key values, and an output port connected to port 54 of the agent for providing the associated search enable signal. Each searching agent also includes a data port connected to port 56 of the agent for receiving table data including the contents of the table entries 82 (FIG. 2B) sequentially broadcast from the table memory unit by the table controller; a contents register unit 94 communicatively coupled with the comparison logic unit 92 as illustrated by a line 96; and a match quality register unit 98 communicatively coupled with the comparison logic unit 92 as is also illustrated by the line 96.

In accordance with the present invention, the comparison logic unit 92 may be adapted to compare each current search key value with each one of the table entries 82 (FIG. 2B) in accordance with a linear searching scheme tailored to a specific application. For each current one of the table entries 82 (FIG. 2B) sequentially received via the data port 56, the comparison logic unit 92 is operative to perform the steps of: comparing the current search key value to a selected portion of the data contents of the current table entry; determining if there is a match between the current search key value and the selected portion of the data contents of the current table entry based on criteria tailored to a specific application; and if a match is determined for the current table entry, determining a match quality value associated with the matching table entry, the match quality value being indicative of the quality of the match between the current search key value and the selected portion of the data contents of the current entry.

The contents register unit 94 provides temporary storage of the contents of currently selected matching ones of the table entries, that are currently selected by the comparison logic unit 92 as a possible best match. The match quality register unit 98 provides temporary storage of match quality values associated with currently selected matching table entries. In accordance with the present invention, the rules for determining the match quality value are application-specific. Examples of particular embodiments are described in detail below. In one embodiment of the present invention, the match quality value associated with each matching table entry determined by reading a particular field of the matching table entry.

In operation of the searching agent unit 52, the contents of the temporary storage registers 94 and 98 are initialized to predetermined values by the comparison logic unit. Upon each cycle in which a current one of the table entries 82 (FIG. 2B) is received, the comparison logic unit 92 generally performs the steps of: comparing a selected portion of the data contents of the current table entry with the search key value to determine whether there is a current match; if there is a current match, determining a current match quality value associated with the current table entry, the match quality value being indicative of the quality of the match between the selected portion of the data contents of the current table entry and the search key value; comparing the current match quality value to the contents of the match quality register 98 to determine if the current matching table entry provides a desirable match than a matching table entry associated with the match quality value stored in the register 98; and if the current matching table entry provides a desirable match than the entry associated with the match quality value stored in the register 98, replacing the contents of the match quality register 98 with the current match quality value, and replacing the contents of the register unit 94 with the data contents of the current matching table entry. This cycle is repeated for a predetermined number of table entries 82 (FIG. 2B), and after a number of clock cycles equal to the predetermined number of entries, the contents register unit 94 will store the contents of a matching table entry having the highest quality match value, and therefore the best available match.

In varying embodiments of the present invention, the broadcast linear searching system 50 (FIG. 2A) may be employed in any of a variety of electronic system to facilitate table searching by a plurality of agents that are each required to search the contents of many entries of the table using different search keys. In one embodiment of the present invention, the broadcast linear searching system of the present invention is used in data forwarding device wherein the table stored in the memory unit 60 (FIG. 2A) includes data forwarding information for determining optimal forwarding routes for portions of data (e.g., data packets), and wherein each of the searching agents 52 (FIG. 2A) is operative to determine the optimal forwarding routes for each of the portions of .data. Examples of data forwarding devices, in which the broadcast linear searching system of the present invention may be employed, include network switching devices, network routing devices, a bridges, gateways, and any other data forwarding device.

Figure 3:
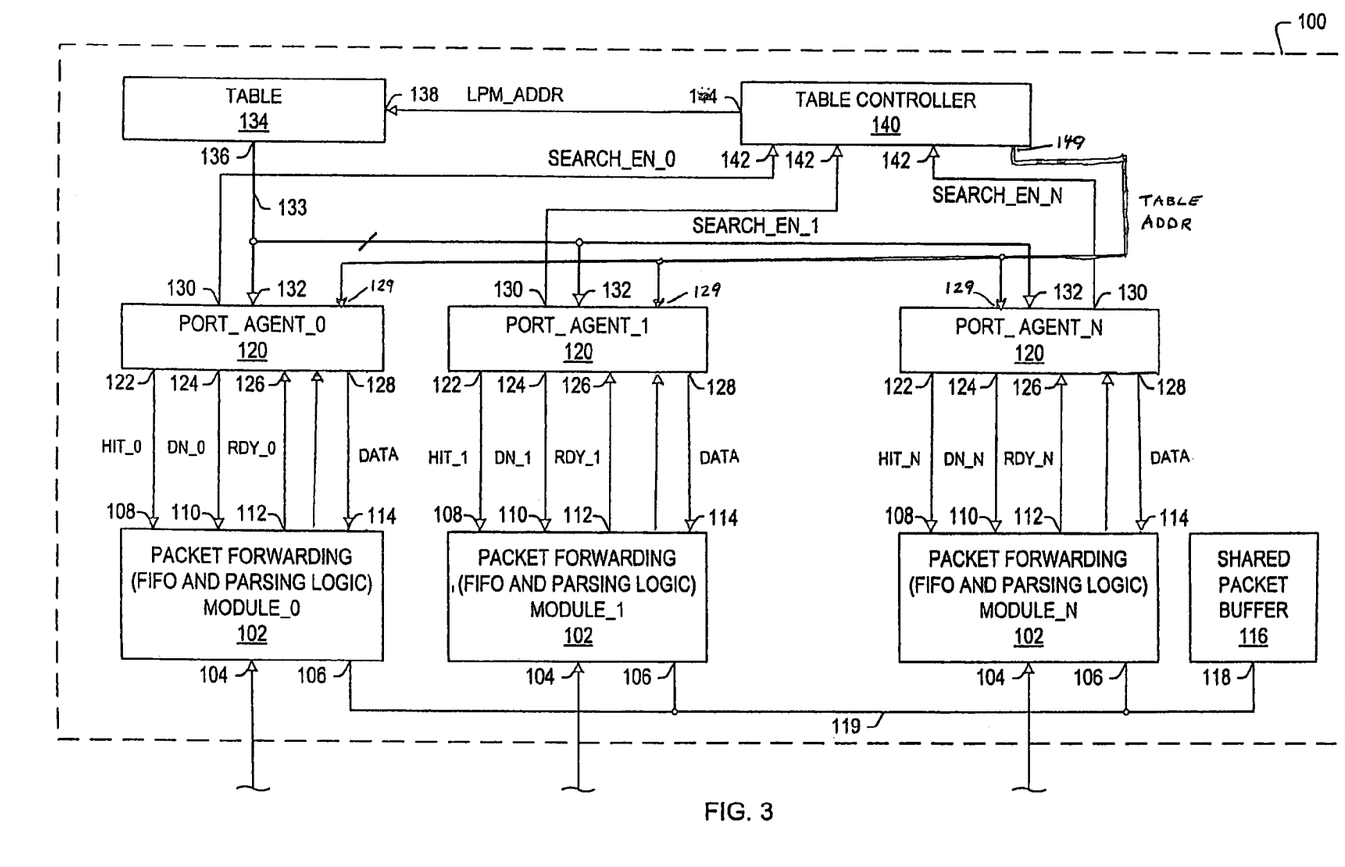
FIG. 3 is a generalized circuit block diagram illustrating a data forwarding device including a broadcast linear searching system in accordance with the present invention.

FIG. 3 shows a generalized circuit block diagram illustrating a data forwarding device at 100 having a broadcast linear searching system in accordance with the present invention. In the depicted embodiment, the data forwarding device 100 is a routing device used in an internet protocol (IP) network for routing IP packets based on network layer (layer 3) information. In an alternative embodiment, the data forwarding device 100 may be switching device used in a network for switching packets based on data link layer (layer 2) information (e.g. MAC address information).

The data forwarding device 100 includes: a plurality of N packet forwarding modules 102 designated MODULE_0, MODULE_1, . . . MODULE_N, each having a packet receiving port 104 for receiving IP data packets via an associated source port of the device 100, a processed packet output port 106 for providing data packets that have been processed in accordance with the broadcast linear searching method of the present invention as further explained below, a search hit input port 108 for receiving an associated one of a plurality of N search hit signals designated HIT_0, HIT_1, . . . HIT_N as further explained below, a search done input port 110 for receiving an associated one of a plurality of N search done signals designated DN_0, DN_1, . . . DN_N as further explained below, packet ready output port 112 for providing as associated one of a plurality of N packet ready signals designated RDY_0, RDY_1, . . . RDY_N as further explained below, and a data port 114 for providing parsed portions of the received data packets for use as a search key values for searching a table, and also for receiving table search results as further explained below; a shared packet buffer 116 having a data port communicatively coupled with the processed packet output port 116 of each of the packet forwarding modules via a bus 119; and a plurality of N port agents 120 designated AGENT_0, AGENT_1, . . . AGENT_N, each being associated with one of the packet forwarding modules 102, and having a search hit output port 122 for providing an associated one of the search hit signals to port 108 of the associated packet forwarding module 102, a search done output port 124 for providing an associated one of the search done signals to port 110 of the associated packet forwarding module, a packet ready input port 126 for receiving an associated one of the ready signals from port 112 of the associated packet forwarding module, a data port 128 communicatively coupled with the data port 114 of the associated packet forwarding module, a search enable output port 130 for providing an associated one of a plurality of N search enable signals designated SEARCH_EN_0, SEARCH_EN_1, . . . SEARCH_EN_N as further explained below, and a table data input port 132 further explained below. Each agent also has an input port 129 which receives the table address of the current data from the table memory unit. In one embodiment of the present invention, the device 100 includes N=22 port agents for the receiving data packet from twelve 1 G-bit ports (not shown) of the device, and one 10 G-bit port (not shown) of the device.

The device 100 further includes: a memory unit 134 for storing a data forwarding table of information having a plurality of entries, and having a data output port 136 for broadcasting the data contents of each of the entries to the data input port 132 of each of the port agents 120, and a memory address control input port 138 for receiving a memory address control signal for accessing specified ones of the entries; and a table controller unit 140 having a plurality of N search enable inputs 142 each for receiving an associated one of the search enable signals from port 130 of an associated one of the port agents 120, an address control signal output port 144 for providing the address control signal to port 138 of the table memory unit 134. The table controller unit 140 also has a port 149 that provides the table address of the current data from the specific table from which the current data comes from. In an embodiment, the table memory unit 134 is a static random access memory (SRAM) device, and each of the table entries is stored at an associated memory address.

Each of the packet forwarding modules 102 includes: a first-in first-out (FIFO) buffer (not shown) for temporarily storing the IP packets received via port 104 while searching operations are performed to determine appropriate routing information associated with the received packet as further explained below; parsing logic (not shown) that is operative to parse the received packets, and extract internet protocol (IP) destination address from the packets for use as search keys to the table stored in the memory unit 134 in order to determine the appropriate forwarding information associated with the packet; and replacement logic for replacing predetermined fields of the received packets with information read from the table stored in memory unit 134 as is further explained below. Each of the packet forwarding modules 102 is operative to provide IP address parsed from the received data packets to the data port 128 of its associated port agent 120.

When a valid data packet is received by one of the packet forwarding modules 102, the module is operative to assert its associated packet ready signal generated at its port 112. At substantially the same time, the packet forwarding module 102 provides an IP address, which is a 32 bit value, from its data port 114 to port 128 of its associated port agent 120. Each of the port agents 120 is responsive to assertion of the associated packet ready signal received at its port 126, and operative to assert its associated search enable signal provided at its port 130. The table controller unit 140 is responsive to at least one of the N search enable signals being asserted, and is operative to begin sequentially accessing table entries of the table stored in the memory unit 134 by sequentially transmitting memory address values to port 138 of the memory unit via the address control signal generated at port 144. In response to the address control signal, the table memory unit 134 pushes the sequence of table entries, one at a time, including the contents of the table entries, to port 132 of each of the agents 120 via the data bus 133. In one embodiment of the present invention, the table memory unit 134, under control of the table control unit 140, pushes one of the table entries to each of the agents upon each cycle of a clock (not shown).

Figure 4:
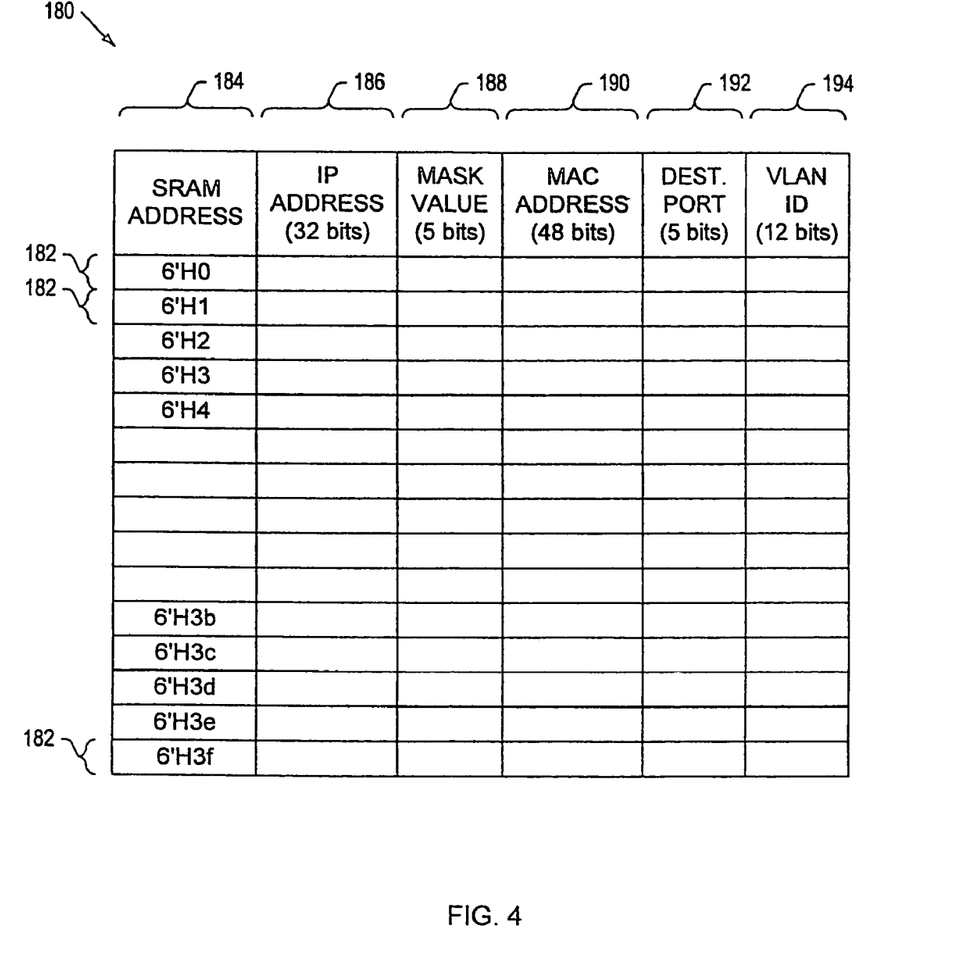
FIG. 4 is a table diagram generally illustrating a longest prefix match table (LPM table) of information which is searched by the broadcast linear searching system of the data forwarding device of FIG. 3.

FIG. 4 shows a table diagram generally illustrating a longest prefix match table (LPM) of information at 180 which is stored in the table memory unit 134 (FIG. 3) in accordance with one embodiment of the present invention. In varying embodiments of the present invention, the table of information stored in the memory unit 134 may include various types of table information having data entries suited for various types of table searching algorithms. In an alternative embodiment further explained below, the table is a policy matching (PM) table of information.

The table 180 includes a plurality of table entries 182, each associated with a memory field address for storing an associated memory address value of the memory unit 184; an associated IP address field 186 for storing an associated 32-bit IP address value; a mask value field 188 for storing an associated 5-bit mask value for use in accordance with LPM searching; an associated MAC address field 190 for storing an associated 48-bit MAC address value; a destination port field 192 for storing an associated 5-bit destination port value indicating an associated destination port of the routing device 100 (FIG. 3); and a VLAN identification field (VLAN ID field) 194 for storing an associated 12-bit VLAN ID value. In the described embodiment, the table 180 includes 64 of the table entries 182 and the table controller unit 140 (FIG. 3) provides SRAM address values between 6'H0 and 6'H3f on every clock. In response to each address value, the table memory unit 134 (FIG. 3) broadcasts 102 bits of data (five concatenated fields). In one embodiment of the present invention, in order to save power, broadcasting is stopped when LPM searching is disabled (using a configuration bit) or when there is no need for accessing the LPM table (when there is no pending packet in a packet processing agent, and no pending CPU access).

Figure 5:
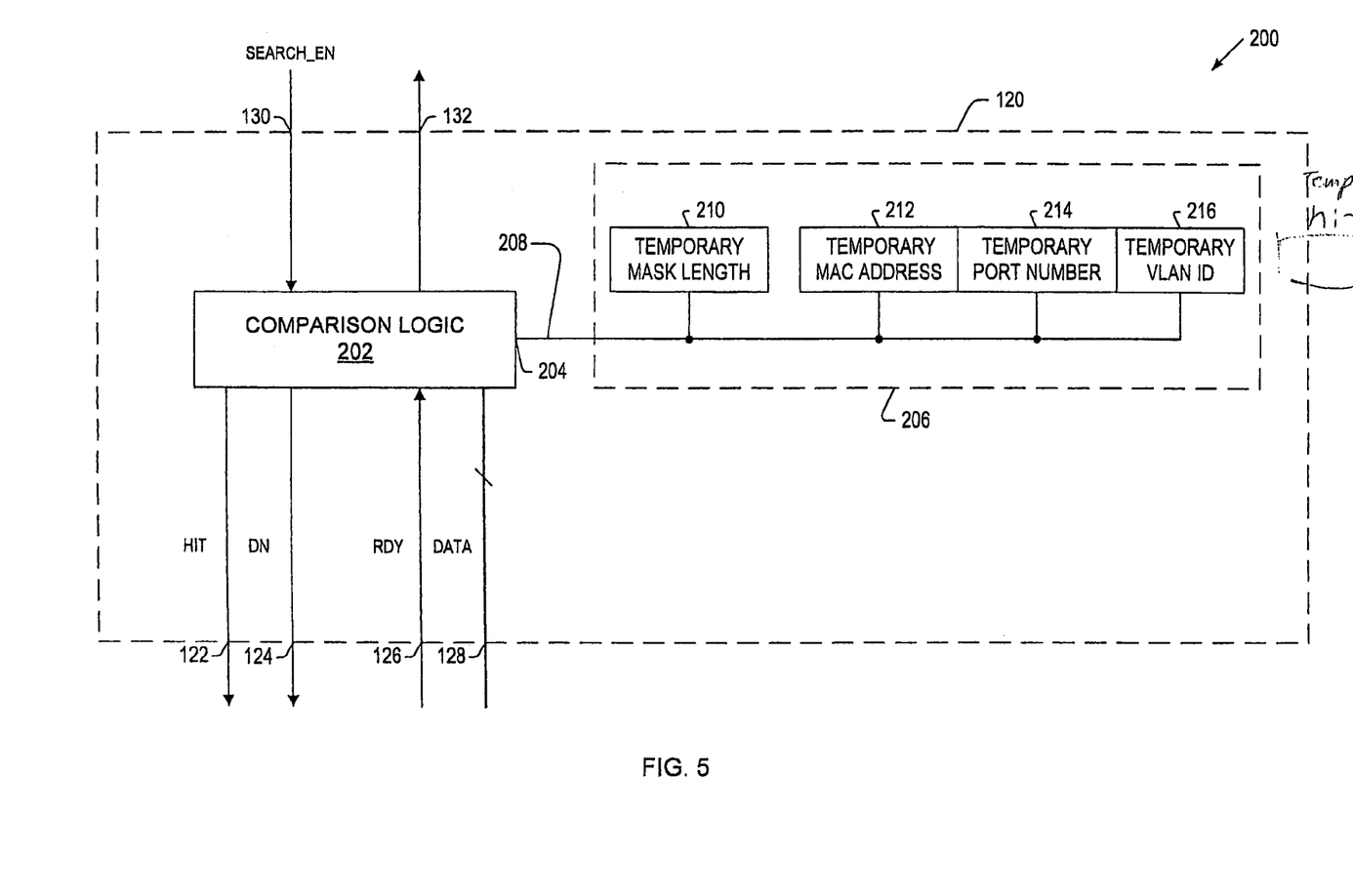
FIG. 5 is a generalized circuit block diagram illustrating components of one of a plurality of port agents of the broadcast linear searching system of FIG. 3.

FIG. 5 shows a generalized circuit block diagram illustrating components at 200 of one of the port agents 120 (FIG. 3). In the depicted embodiment, the searching agent 120 includes: a comparison logic unit 202 having a port connected to port 122 of the agent 120 for providing the associated search hit signal, a port connected to port 124 of the agent for providing the associated search done signal, a port connected to port 126 of the agent for receiving the associated packet ready signal, a port connected to port 128 of the agent for receiving IP address values parsed from data packets received by the associated forwarding module 102 (FIG. 3), a port connected to port 130 of the agent for providing the associated search enable signal, a port connected to port 132 of the port agent for receiving the data contents of table information broadcast from the table memory unit 134 (FIG. 3), and a port 204; and a temporary register unit 206 communicatively coupled with port 204 of the comparison logic unit 202 as illustrated by a line 208. The temporary register unit 206 includes: a temporary mask length register 210 communicatively coupled with the comparison logic unit 202; a temporary MAC address register 212 communicatively coupled with the comparison logic unit; a temporary port number register 214 communicatively coupled with the comparison logic unit 202; and a temporary VLAN ID register 216 communicatively coupled with the comparison logic unit 202.

In one embodiment of the present invention, the comparison logic writ 202 is operative to perform an LPM searching algorithm which includes LPM masking and comparing operations wherein unmasked portions of each one of the received IP address values, received via port 128 of the port agent, are compared with unmasked portions of the contents of the IP address field 186 (FIG. 4) of each one of the table entries 182 in accordance with the LPM algorithm. For each current one of the table entries 82 (FIG. 2B) sequentially received via the data port 132 of the port agent, the comparison logic unit 202 first reads the contents of the mask value field 188 (FIG. 4) to determine a mask value, M, associated with the current entry. The comparison logic unit 202 is then operative to compare the unmasked portion of the current IP address value to the unmasked portion of the contents of the IP address field of the current entry wherein the least significant M bits of each of the compared values are masked out.

In accordance with LPM searching, a best available match is determined for a particular received IP address value by determining which of the table entries includes an IP address value in its field 186 (FIG. 4) having the greatest number of most significant bits matching associated most significant bits of the particular IP address value. For example, in the case of 32-bit IP address values, if the table search yields two matching table entries (one wherein the contents of the table entry includes 20 matching bits, and one wherein the contents of the table entry includes 19 matching bits), the table entry with the greatest number of matching bits (20 matches) is selected. In the case of a 32-bit IF address, the longest possible match is matching all 32 bits, which is an exact match, while the shortest possible match is matching only one bit. LPM searches all the table entries and finds the best available match.

The temporary register unit 206 provides temporary storage of the contents of currently selected ones of the table entries that are currently selected by the comparison logic unit 202 as a possible best match. Specifically, the mask length register 210 provides storage of the mask value of a temporarily selected one of the table entries, the MAC address register 212 provides storage of the MAC address value of a temporarily selected one of the table entries, the port number register 214 provides storage of the port number of a temporarily selected one of the table entries, and the VLAN ID register 216 provides storage of the VLAN ID address value of a temporarily selected one of the table entries In operation of the searching agent 120, the contents of the temporary storage registers 212, 214, and 216 are initially set to zero by the comparison logic unit 202. Also, each bit of the temporary mask length register 210 is initially set to hex 1 F by the comparison logic unit 202. In one embodiment of the present invention, the temporary mask length register 210 is a five bit register which provides for storage of a mask length decimal value of 32 which accounts for masking up to 32 bits of the IF address values which are compared in accordance with a step of the LPM searching algorithm. In this embodiment, the contents of the temporary mask length register 210 is initially set to 1 F (Hexadecimal).

For each particular received IP address, received via the data port 128 of the agent from the associated packet forwarding module 102 (FIG. 3), upon each cycle in which a current one of the table entries 182 (FIG. 4) is received from the table memory unit 134 (FIG. 3), the comparison logic unit 202 performs the LPM searching operation to process the current entry. For each current one of the table entries, the LPM searching operation performed by the comparison logic unit 202 includes: reading the contents of the mask value field 188 (FIG. 4) of the current table entry to determine a current mask value, M, associated with the current entry; comparing an unmasked portion of the received IP address value to an unmasked portion of the contents of the IP address field 186 (FIG. 4) of the current entry wherein the least significant M bits of each of the compared values are masked out; determining if there is a match; and if there is a match, then determining whether the current mask value is less than the stored contents of the temporary mask length register 210; and if the current mask value is less than the stored contents of the temporary mask length register 210, replacing the contents of the temporary mask length register 210 with the current mask value, and replacing the contents of the temporary registers 212, 214, and 216 with the MAC address value, destination port number value, and VLAN ID value of the current table entry.

If the comparison logic unit 202 determines that there is a match between the specified unmasked portion of the received IP address value and the specified unmasked portion of the contents of the IP address field 186 (FIG. 4), and if the current mask value is less than the stored contents of the temporary mask length register 210, then the comparison logic unit 202 asserts the associated search hit signal provided at port 122 of the port agent. Once asserted, the search hit signal remains asserted until all of the 64 table entries 182 (FIG. 4) have been received and processed by the comparison logic unit. After all of the 64 table entries have been received and processed, the comparison logic unit asserts the associated search done signal provided port 124 of the port agent, and provides the final stored contents of the temporary registers 212, 214, and 216 (including a MAC address value, a forwarding port number, and a VLAN ID value of the best matching table entry) to the associated one of the packet forwarding modules 102 (FIG. 3) via the data port 128 of the port agent. If the associated search hit signal port 128 is not asserted by the time that the associated search done signal is asserted, then the associated packet forwarding module 102 (FIG. 3) receiving these signals determines that no match was found for the current received IP address value, that is for the current packet. As mentioned, each of the packet forwarding modules 102 (FIG. 3) includes: a FIFO buffer (not shown) for temporarily storing the packets received via its receiving port 104 while searching operations are performed to determine appropriate routing information; and replacement logic for replacing fields of the received packets with information contained within the best matching table entry. In the embodiment wherein the data forwarding device 100 (FIG. 3) is a network layer routing device, in which the received data packets are routed based on their IP address, the MAC address values and VLAN ID values of the packets are replaced when a matching table entry if found.

Provided that a match has been found as described above, each of the packet forwarding modules 102 (FIG. 3) is operative to replace the MAC address field and VLAN ID field of the received packets with the MAC address and VLAN ID of the best matching one of the table entries 182 (FIG. 4). Each of the packet forwarding modules 102 (FIG. 3) is further operative to transmit the routed data packet, having replaced fields if a match was found, to port 118 of the shared packet buffer 116 via the bus 119.

Figure 6:
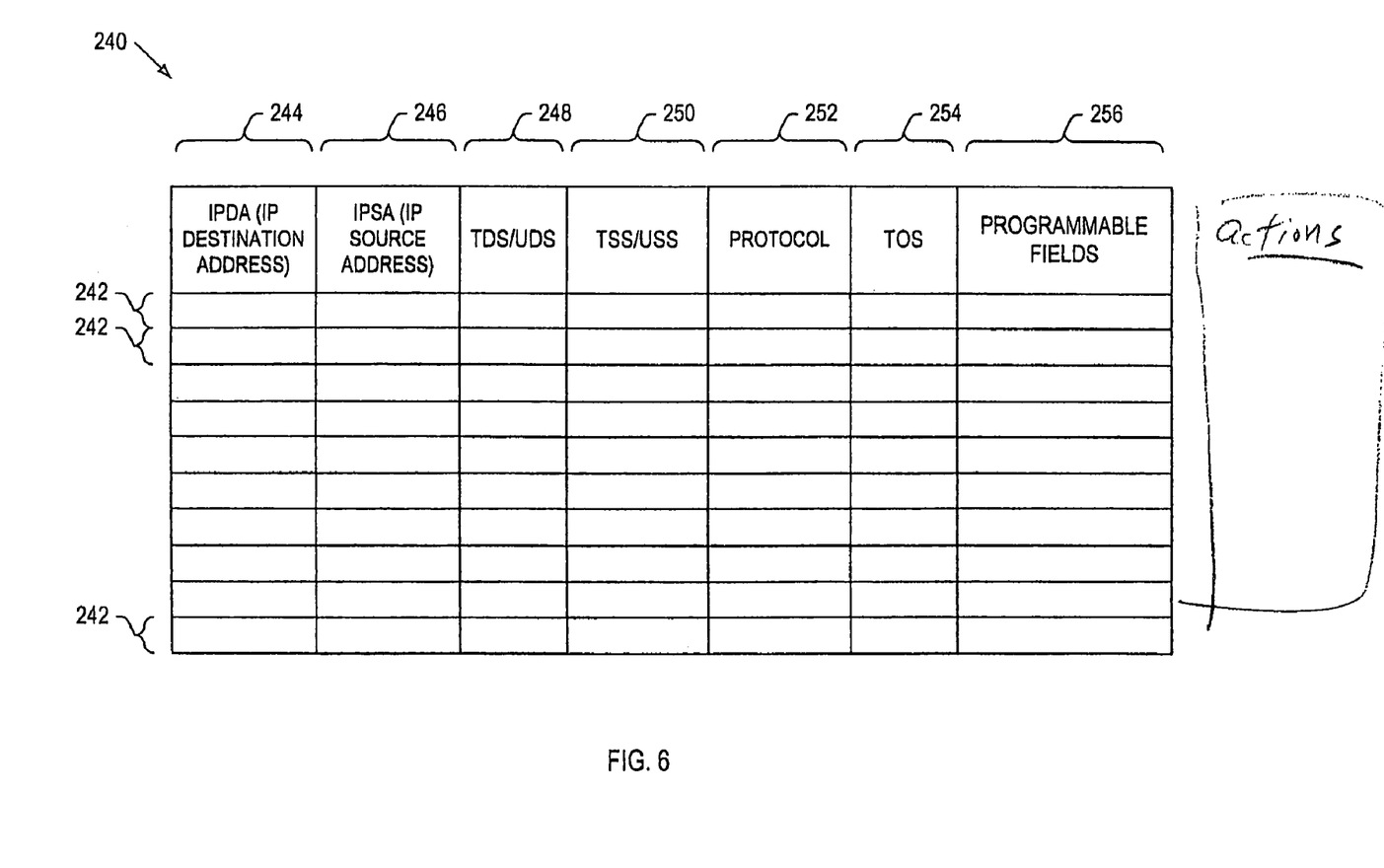
FIG. 6 is a table diagram generally illustrating a policy matching table (PM table) of information which is searched by the broadcast linear searching system of the data forwarding device of FIG. 3 in accordance with an alternative embodiment of the present invention.

FIG. 6 shows a table diagram generally illustrating a policy matching table (PM table) of information at 240 which is stored in the table memory unit 134 (FIG. 3) in accordance with another embodiment of the present invention. The table 240 includes a plurality of table entries 242, each including: an IP destination address (IPDA) field 244 for storing an associated 32-bit IP destination address value; an IP source address (IPSA) field 186 for storing an associated 32-bit IP source address value; a TDS/UDS field 248 for storing an associated TDS/UDS value; a TSS/USS field 250 for storing an associated TSS/USS value; a protocol field 252 for storing an associated protocol value; a type of service (TOS) field 254 for storing an associated TOS value; and at least one programmable field 256 for storing associated programmable parameters.

The match fields 244 through 256 of the table 240 are used along with corresponding actions (forward packet, drop packet, change VLAN ID, change priority)

One example of a PM rules is: "(1) allow packet to be forward to IP subnet of 0ABC_XX:XX only; (2) all other packets should be dropped. Any packet with TCP Source Port Number greater than 'd15 should change DSCP to 6'b11_0000 and send to CPU." To resolve a conflict arising when more than one rule is matched, the rules in PM table should have priority. However, PM searching is a best match searching algorithm because a port agent may need to search each entry of the table 240 before finding a best available match. PM searching is commonly used in firewall applications, generally for security purposes. Based on PM table information, a user of the device 100 (FIG. 3) may define actions (policies) which are programmable. One common example of a policy rule includes rules for dropping any packet that originates from a competing company.

Figure 7:
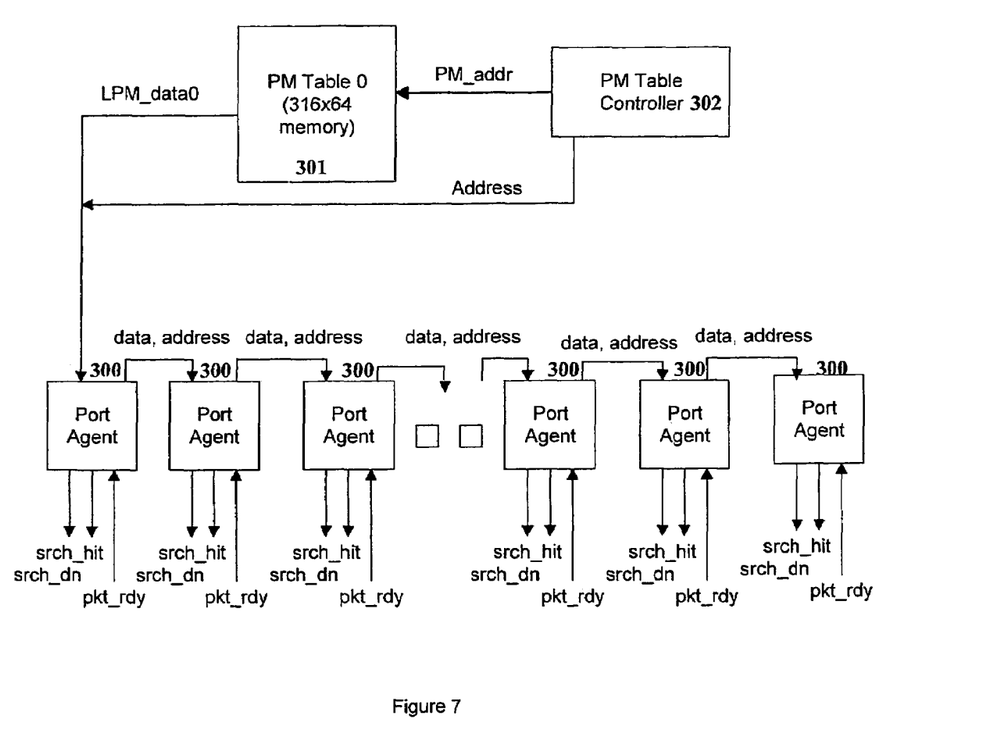
FIG. 7 is a generalized circuit block diagram illustrating a broadcast linear searching system in accordance with an alternate embodiment of the invention.

FIG. 7 illustrates a generalized circuit block diagram of an alternate embodiment of the invention. In FIGS. 2A and 3, the table unit has a direct connection to each of the agents. Depending on the number of agents, the connections can take up a lot of real estate. In order to minimize the high fanout from the table memory, one alternative is to deliver the data using a ring topography. The table controller 302 provides an address to the table memory unit 301 and the table entry and the address are sent to a first port agent 300. Thereafter, the data and address are passed on to the next port agent 300, and so on. In this mode, data may takes N clock cycles to Nth port; however the fanout is only one. The limitation of this mode is that the table entries need to be broadcast continuously.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A table searching method, the method comprising the steps of:
   providing a plurality of searching agents each being communicatively coupled with a memory unit, each of said searching agents receiving an associated search value;
   receiving, by each of said agents, at least one table entry broadcast by the memory unit; and
   processing said at least one table entry by each of said searching agents to determine if a match occurs between the associated search value and the at least one table entry.

2. A table searching method as recited in claim 1 wherein the memory unit comprises at least one memory unit having a plurality of tables and said step of receiving at least one table entry comprises receiving said at least one table entry and a table address associated with a selected table of said plurality of tables.

3. A table search method as recited in claim 1 wherein said step of receiving at least one table entry comprises receiving multiple table entries at the same time and said step of processing said at least one table entry comprises comparing the multiple table entries with the associated search value.

4. A table search method as recited in claim 1 wherein said step of receiving at least one table entry comprises each of said plurality of search agents receiving said at least one table entry at the same time.

5. A table search method as recited in claim 1 wherein said step of receiving at least one table entry comprises a first search agent of said plurality of search agents receiving said at least one table entry and the first search agent passing said at least one table entry to a next search agent such that all of the plurality of search agents receive said at least one table entry in turn.

6. A table searching method as recited in claim 1 wherein in said processing step each of said searching agents determines said match as an associated best matching of a plurality of table entries in accordance with a longest prefix match searching process.

7. A table searching method as recited in claim 1 wherein in said processing step each of said searching agents determines said match as an associated best matching of a plurality of table entries in accordance with a policy match searching process.

8. A table searching method as recited in claim 1 further comprising the steps of:
   providing a controller unit that controls said memory unit; and
   providing a series of memory address values to said memory unit by said controller unit,
   wherein said memory unit responds to said memory address values, and table entries received by each of said agents are based on said memory address values.

9. A table searching method as recited in claim 8 wherein each of said agents is communicatively coupled with said controller unit and each of said agents provides a search enable signal to said controller unit in response to receiving said associated search value, said step of providing said series of memory address values occurs in response said search enable signal by at least one of said agents.

10. A table searching method, the method comprising the steps of:
    providing a plurality of searching agents, each being communicatively coupled with a memory unit, each of said searching agents receiving an associated search value; and
    broadcasting at least one table entry by the memory unit to each of said searching agents;
    wherein each of said searching agents determines if a match occurs between the associated search value and the table entry.

11. A table search method as recited in claim 10 wherein said step of broadcasting at least one table entry comprises broadcasting multiple table entries at the same time and said searching agents determines if a match occurs between the multiple table entries and the associated search value.

12. A table search method as recited in claim 10 wherein said step of broadcasting at least one table entry comprises broadcasting to each of said plurality of search agents said at least one table entry at the same time.

13. A table search method as recited in claim 10 wherein said step of broadcasting at least one table entry comprises providing a first search agent of said plurality of search agents with said at least one table entry and the first search agent passing said at least one table entry to a next search agent, such that all of the plurality of search agents receive said at least one table entry in turn.

14. A table searching method as recited in claim 10 wherein said memory unit comprises at least one memory unit having a plurality of tables and said step of broadcasting at least one table entry comprises broadcasting said at least one table entry and a table address associated with a selected table of said plurality of tables.

15. A table searching method as recited in claim 10 wherein each of said searching agents determines said match as an associated best matching of a plurality of table entries in accordance with a longest prefix match searching process.

16. A table searching method as recited in claim 10 wherein each of said searching agents determines said match as an associated best matching of a plurality of table entries in accordance with a policy match searching process.

17. A table searching method as recited in claim 10 further comprising the steps of:
    providing a controller unit that controls said memory unit; and
    providing a series of memory address values to said memory unit by said controller unit,
    wherein said memory unit responds to said memory address values, and table entries broadcast to each of said agents are based on said series of memory address values.

18. A table searching method as recited in claim 17 wherein each of said agents is communicatively coupled with said controller unit and each of said agents provides a search enable signal to said controller unit in response to receiving said associated search value, said step of providing said series of memory address values occurs in response said search enable signal by at least one of said agents.

19. A table searching system comprising:
- a memory unit;
- a plurality of searching agents each being communicatively coupled with said memory unit, and being configured to receive an associated search key value; and
- a memory controller unit providing a centralized interface between said memory unit and each of said agents, said controller unit being operative to control said memory unit to broadcast contents of table entries in the memory unit to each of said searching agents;
- each of said searching agents being operative to determine an associated best matching one of said table entries based on comparisons between said associated key value and the contents of said table entries.

20. A table searching system as recited in claim 19 wherein said memory unit comprises a static random access memory (SRAM) unit.

21. A table searching system as recited in claim 19 wherein each of said searching agents is operative to determine said associated best matching one of said table entries in accordance with a longest prefix match searching process.

22. A table searching system as recited in claim 19 wherein each of said searching agents is operative to determine said associated best matching one of said table entries in accordance with a policy match searching process.

23. A table searching system as recited in claim 19 wherein said memory controller unit controls said memory unit by providing a series of memory address values to said memory unit, and wherein said memory unit is responsive to said memory address values, and operative to broadcast the contents of one of said table entries to each of said agents during each of said cycles.

24. A table searching system as recited in claim 23 wherein each of said agents is communicatively coupled with said controller unit for providing an associated one of a plurality of search enable signals to said controller unit, each of said agents being operative to assert said associated enable signal in response to receiving said associated search key value, said controller unit being operative to provide said series of memory address values to said memory unit in response to at least one of said search enable signals being asserted.

25. A table searching system as recited in claim 19, wherein each of said agents further comprises:
- a comparison logic unit for receiving said associated search key value, and for receiving said contents of said table entries provided by said memory unit;
- a data register communicatively coupled with said comparison logic unit;
- a match quality register communicatively coupled with said comparison logic unit, said quality register for storing temporarily selected match quality values associated with temporarily selected ones of said entries;
- said comparison logic unit being operative during each of said cycles to perform a best match table searching process including the steps of,
  - comparing said associated key value to a selected portion of the contents of said current entry to determine whether there is a current match, and
  - if a current match is determined between said associated key value and said selected portion of said contents of said current entry,
    - determining a current match quality value associated with said current entry, said current match quality value being indicative of a quality of said current match,
    - comparing said current match quality value to a previous temporarily selected match quality value stored in said match quality register to determine if said current match is a more desirable match than a match associated with said previous temporarily selected match quality value, and
    - if said current match is a more desirable match than a match associated with said previous temporarily selected match quality value, replacing the contents of said match quality register with said current match quality value, and
- replacing the contents of said data register with the data contents of said current entry.

26. A table searching system as recited in claim 25 wherein:
- said table of information is a policy match table;
- each of said data entries includes key fields for storing associated stored key values and mask value fields storing associated mask values; and
- said searching process includes comparing an unmasked portion of said associated received key value to an unmasked portion of said stored key value of said current entry, each of said unmasked portions of said received key value and said stored key value being defined by masking a number of least significant bits indicated by the mask value of said current entry.

* * * * *